Dec. 17, 1963     B. A. BOGGS     3,114,273
VARIABLE SPEED TRANSMISSION
Filed May 15, 1962     10 Sheets-Sheet 2

INVENTOR.
BERYL A. BOGGS
BY MAHONEY, MILLER & RAMBO
BY
ATTORNEYS.

INVENTOR.
BERYL A. BOGGS
BY MAHONEY, MILLER & RAMBO
BY
ATTORNEYS.

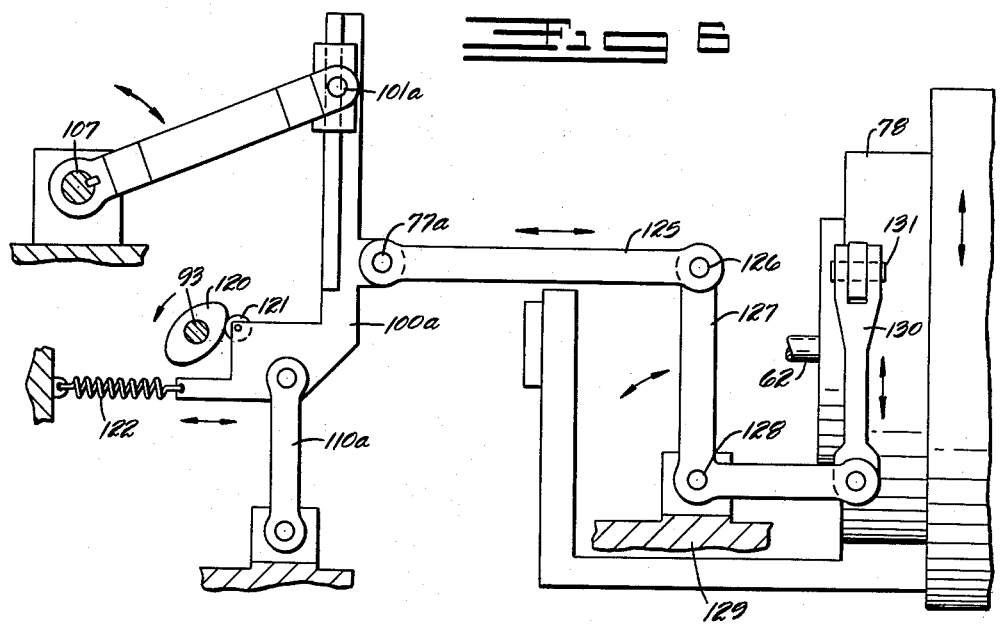
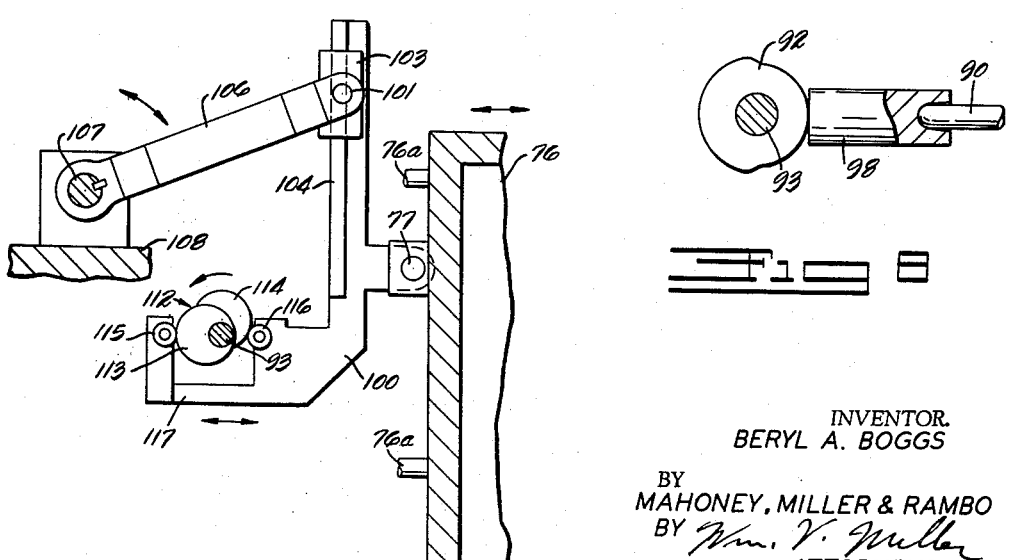

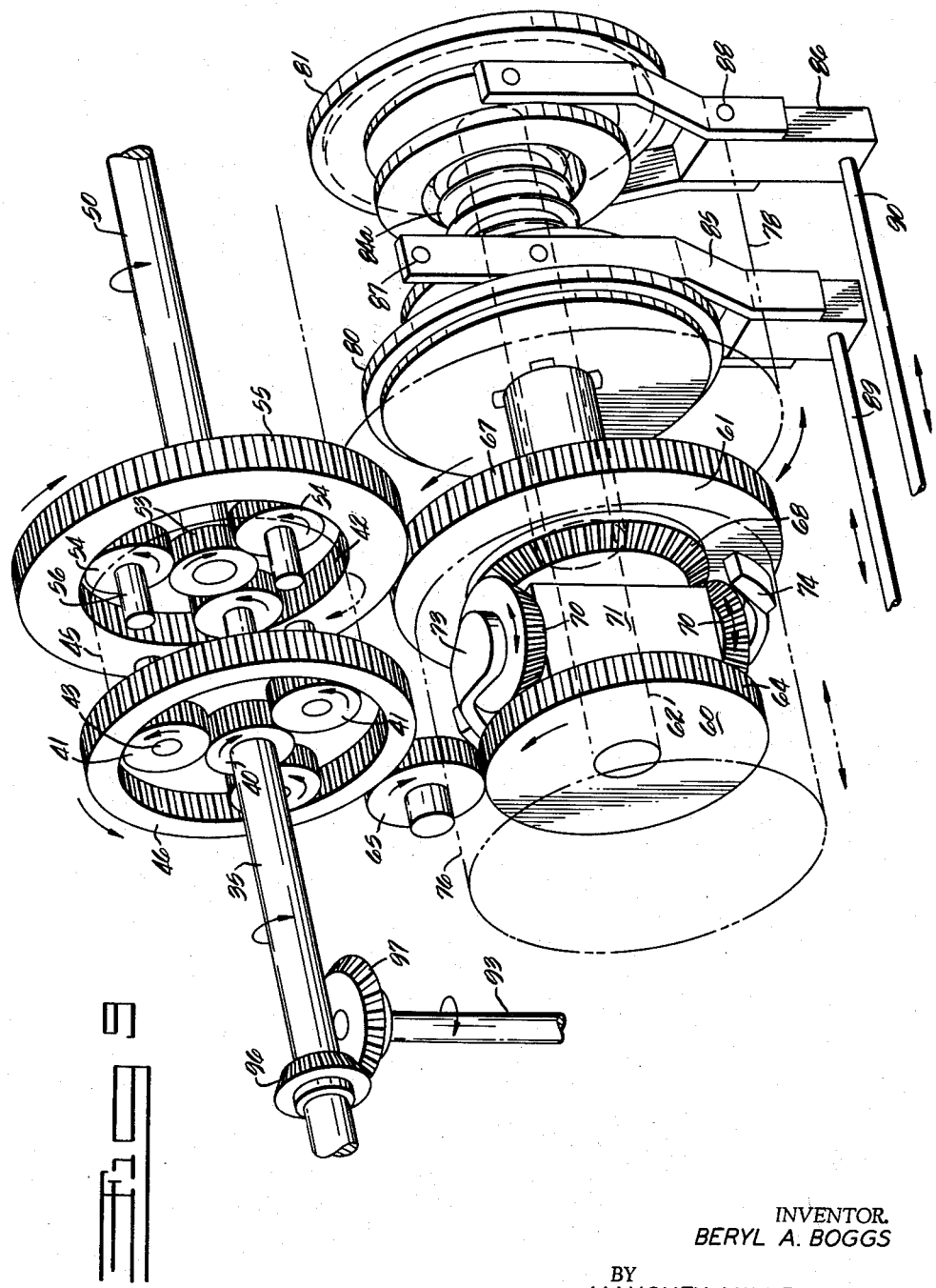

Dec. 17, 1963  B. A. BOGGS  3,114,273
VARIABLE SPEED TRANSMISSION
Filed May 15, 1962  10 Sheets-Sheet 7

MAIN ACTUATING CAM  COMPENSATING CAM

INVENTOR.
BERYL A. BOGGS.
BY
MAHONEY, MILLER & RAMBO
BY Wm. V. Miller
ATTORNEYS.

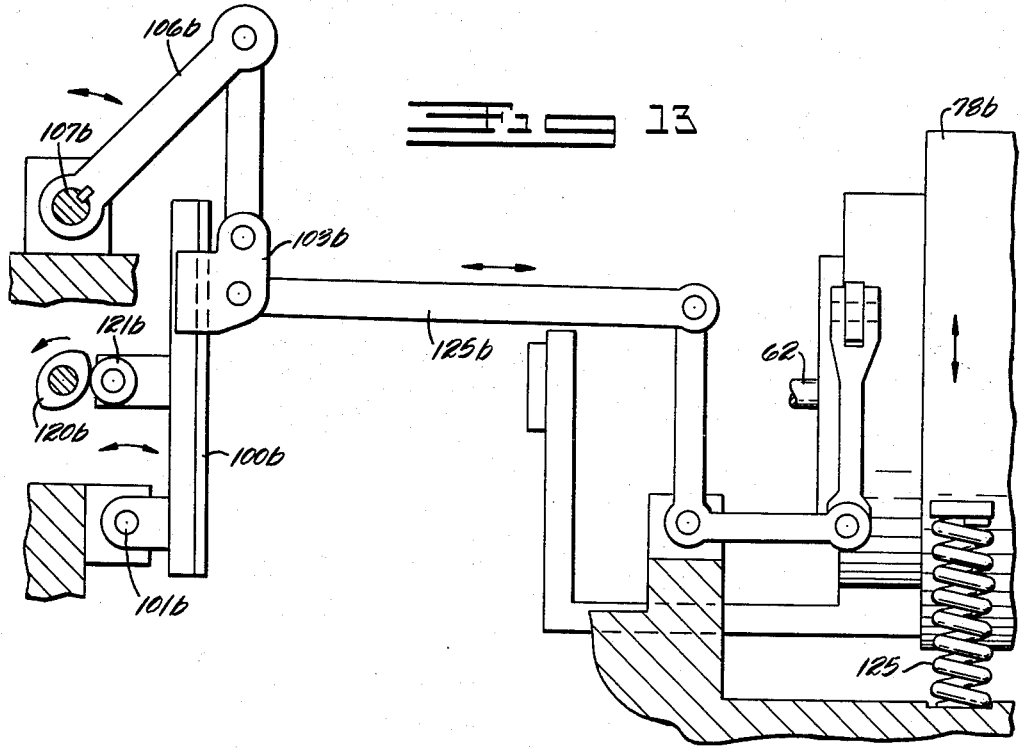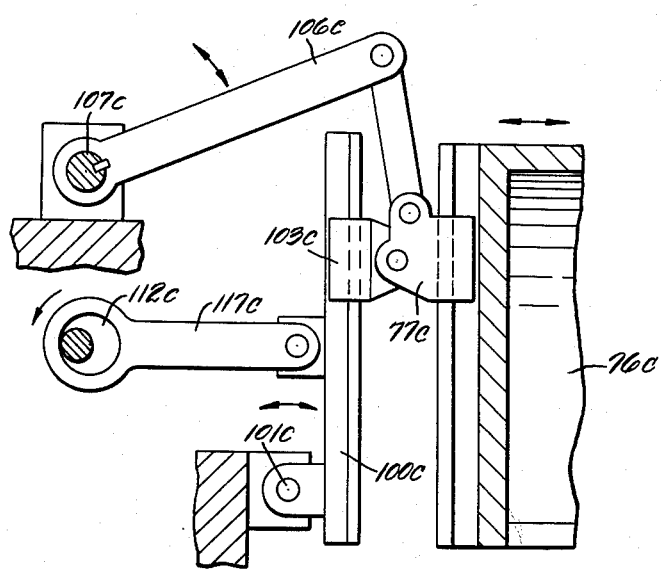

Dec. 17, 1963     B. A. BOGGS     3,114,273
VARIABLE SPEED TRANSMISSION

Filed May 15, 1962     10 Sheets-Sheet 9

INVENTOR.
BERYL A. BOGGS.
BY
MAHONEY, MILLER & RAMBO
BY Wm. V. Miller
ATTORNEYS.

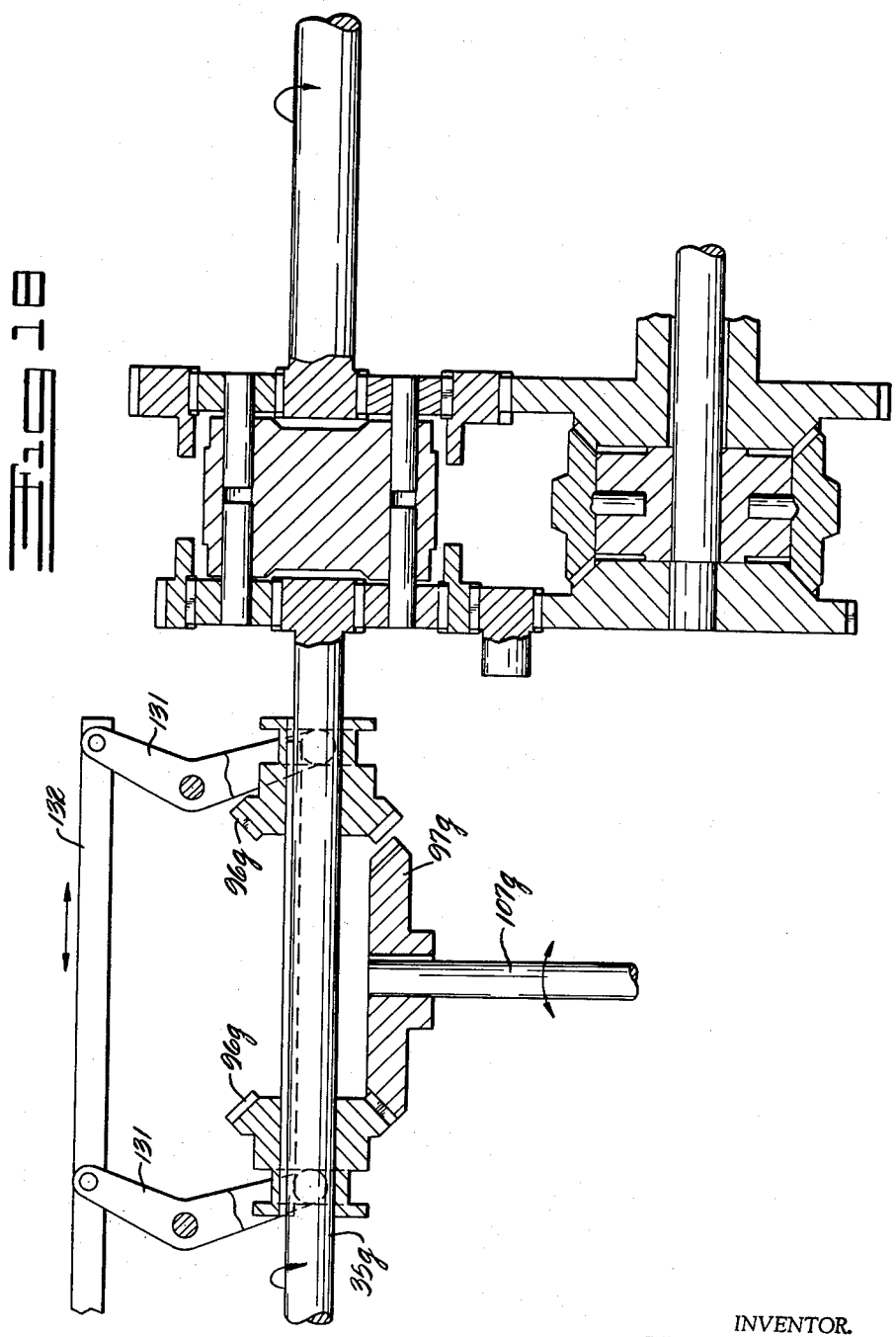

United States Patent Office 3,114,273
Patented Dec. 17, 1963

3,114,273
VARIABLE SPEED TRANSMISSION
Beryl A. Boggs, Lucasville, Ohio
(Rte. 3, Box 310, Chester, Va.)
Filed May 15, 1962, Ser. No. 194,844
17 Claims. (Cl. 74—679)

My invention relates to a variable speed transmission. It has to do, more specifically, with an infinitely variable, positive drive, geared transmission for converting the constant speed of an input or driving member to any desired speed in an output or driven member. The transmission of my invention may be designed as a speed reducing unit to include speed changing or selecting mechanism to select an output speed from zero speed to the speed of the driver or even a reverse variable speed with a maximum reverse speed less than the driver speed. The transmission of my invention may also be designed as a speed increasing unit to include speed changing or selecting mechanism to select an output speed greater than that of the driver. Furthermore, the transmission of my invention may be designed as a combination speed reducing or speed increasing unit, with control mechanism selectively operable to cause the unit to function as a speed reducer or speed increaser.

According to my invention, the drive is transmitted from a driving member to a driven member through two epicyclic gear trains which are operatively connected together. The input may be in the form of an input shaft geared to the input train of planetary gearing and the output may be in the form of an output shaft geared directly to the output train of planetary gearing. To control the output speed, one gear member of each train is permitted to rotate at a controlled speed while absorbing the reaction force of the other gear members of that train. This control is accomplished by means of a differential gear unit which includes two differential gears, one of which is engaged with the said gear member of each epicyclic train to control its rotation. Between and engaging both of these differential gears is one or more differential gear pinions with its axis extending radially of the differential gears which can be oscillated or rocked between said gears about its own axis and which is so mounted that upon oscillation it will travel around the axis of the differential gears. Brakes are associated with the respective differential gears and are operable to stop rotation of both gears or to alternately release one and lock the other. Cam-actuated linkage is provided for oscillating the differential pinions and in synchronism operating the brakes. The result is that when one differential gear is locked and the differential pinion is oscillated in engagement therewith, the other differential gear is permitted to rotate. Consequently, the gear of the planetary train with which the latter gear is engaged is permitted to rotate because of the reactive force of that gear train. This alternate release of one differential gear and its associated gear train, permits the reaction force of that gear train and the cam-actuated linkage to control the speed developed at the output shaft.

In the accompanying drawings, I have illustrated embodiments of my transmission but it is to be understood that details thereof may be varied without departing from basic principles of the invention.

In the drawings:

FIGURE 6 is a longitudinal sectional view taken along line 6—6 of FIGURE 1 and showing the compensating cam mechanism of the transmission speed control mechanism.

FIGURE 7 is a longitudinal sectional view taken along line 7—7 of FIGURE 1 and showing the main actuating cam mechanism of the transmission speed control mechanism.

FIGURE 8 is a detail in section taken along line 8—8 of FIGURE 1 showing the brake-actuating cam and rod.

FIGURE 9 is a diagrammatic perspective view illustrating the operation of the entire transmission.

FIGURE 10 is a time-velocity diagram for the transmission.

FIGURE 13 is a view partly in side elevation and partly in section illustrating a different type of compensating cam mechanism.

FIGURE 14 is a view partly in side elevation and partly in longitudinal section illustrating a different type of main actuating cam mechanism.

FIGURE 18 is an axial sectional view showing an arrangement for selectively adjusting the control mechanism of the transmission so that it functions as a speed reducer or a speed increaser.

With reference to the drawings, in FIGURES 1 to 9 I have illustrated a preferred general form of my transmission. In this illustration, I have shown the transmission with its main axis horizontal but it is to be understood that it can be in various other positions. Any suitable frame or housing structure may be provided and this may include the upright end walls or support plates 31 and 32 which carry the shaft bearings 33 and 34, respectively.

Figure 1:
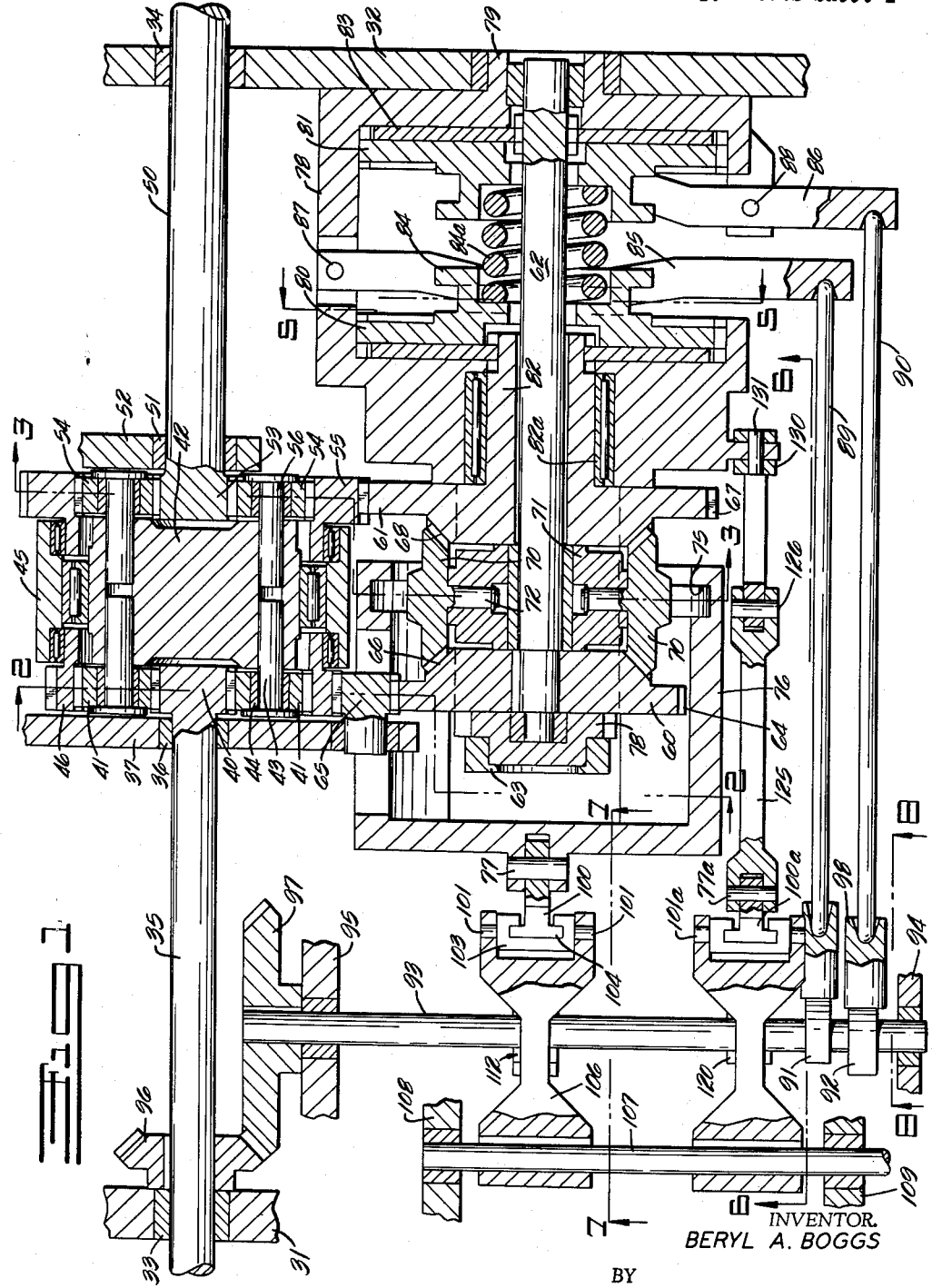
FIGURE 1 is an axial longitudinal sectional view, partly broken away, taken through one form of a transmission embodying my invention.
Figure 2:
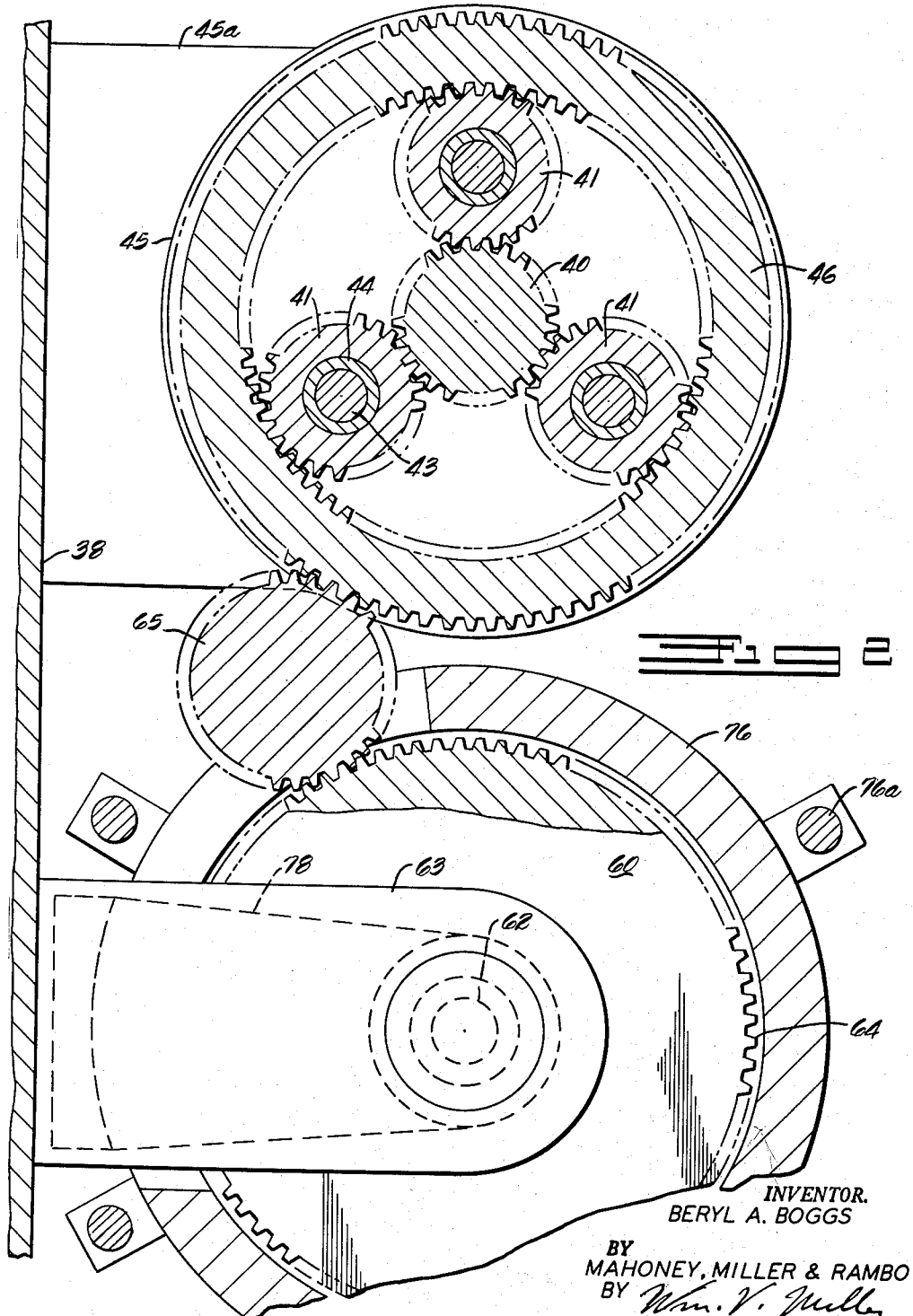
FIGURE 2 is an enlarged transverse sectional view taken along line 2—2 of FIGURE 1 at the input side of the transmission.

The input member of the transmission is shown as being in the form of the input shaft 35 (FIGURES 1 and 9) which may be driven continuously in a suitable manner, which may be clockwise as viewed from the left in FIGURE 9. Its outer end is supported by the bearing 33 and its inner end is supported by a bearing 36 which is carried by a support bracket 37 that may project from the rear wall 38, the rear wall being shown in FIGURE 2. The inner end of the input shaft 35 non-rotatably carries a drive or sun gear or pinion 40. Disposed around the sun pinion 40 at angularly spaced positions are the planetary gears or pinions 41. Each of the planetary gears 41 is rotatably mounted on a carrier 42 of drum-like form by means of a shaft or pin 43 and a bearing 44 (FIGURES 1 and 2). The carrier 42 is mounted for rotation within a bearing ring 45 which may be supported in a fixed position such as from the rear wall 38 of the housing by means of a bracket 45a similar to the bracket 37 and which is shown in FIGURE 2. The planetary gears 41 all mesh with the internal teeth of a ring gear 46 which also has exterior teeth. The ring gear 46 is rotatably carried by the bearing ring 45 and is capable of rotating relative to the carrier 42. Thus, the sun gear 40, the planetary gears 41, and the ring gear 46 form an epicyclic gear train at the input side of the transmission.

A similar epicyclic gear train is provided at the output side of the transmission (FIGURES 1, 3 and 9) for driving the output member which is in the form of an output shaft 50. This shaft 50 is carried at its outer end in the bearing 34 and at its inner end in a bearing 51 which is mounted in a support bracket 52 similar to the bracket 37. This gear train comprises the driven sun pinion or gear 53, which meshes with the pinion gears or pinions 54 angularly spaced therearound which, in turn, mesh with the ring gear 55. The gear 55 is supported like the gear 46 for rotation relative to the carrier 42 and the bearing ring 45. The planetary gears are supported on the carrier 42 for rotation about their axes, similar to the gears 41, by means of the shafts or pins 56. With the ring gears 46 and 55 stationary, the input shaft 35 will rotate the output shaft 50 in the same direction and at the same speed, because in the usual manner, the input epicyclic gear train will act to reduce speed and the output epicyclic gear train will act to increase speed.

As indicated previously, to vary the output speed relative to the input speed, I provide a differential gear unit for controlling the speed of rotation of the output shaft 50 and this is done by controlling rotation of the ring gears 46 and 55. Thus, one member (46 and 55) of the respective epicyclic gear trains is permitted to rotate at a controlled speed while absorbing the reaction force of the other two members (the sun gear 40 or 53 and the carrier 42).

This differential gear unit comprises a pair of axially spaced differential gears 60 and 61. The gear 60 is keyed on a shaft 62 which extends parallel to the common axis of the output and input shafts 50 and 35 and which is rotatably mounted, its inner end being carried by a bearing in the inner end of a housing 78 to be described later. This end of the housing 78 is rotatable in a support bracket 63 which extends forwardly from the rear wall of the main housing. This gear 60 has an outer ring gear portion 64 which meshes with an idler pinion 65 that, in turn, meshes with the outer gear teeth of the input planetary ring gear 46. It is also provided with a bevel gear portion 66 formed on its inner face around its axis. As will appear later, this gear portion 66 may be in the form of a continuous circle to facilitate production, although only certain segmental sections of it will be employed. If desired, only these sections need have teeth. The gear 61 is similar to the gear 60 but is rotatably mounted in surrounding relationship to the shaft 62 and has an outer ring gear portion 67 which meshes with the outer gear teeth of the output planetary ring gear 55. The gear 61 is also provided with a bevel gear portion 68 formed on its inner face which may or may not be a complete circle of teeth. Because of the provision of the idler 65, both differential gears 60 and 61 will be driven in the same direction by the epicyclic gearing, that is, counterclockwise as viewed in FIGURE 9 from the left. It will be noted from FIGURE 1 that the pinion 65 is rotatably supported from the bracket 37. Thus, the gears 60 and 61 are mounted for relative rotation about the axis of the shaft 62. The outer end of the shaft 62 is rotatably supported in the outer end of the housing 78 which, in turn, is rotatably supported by the housing wall 32.

Figure 3:
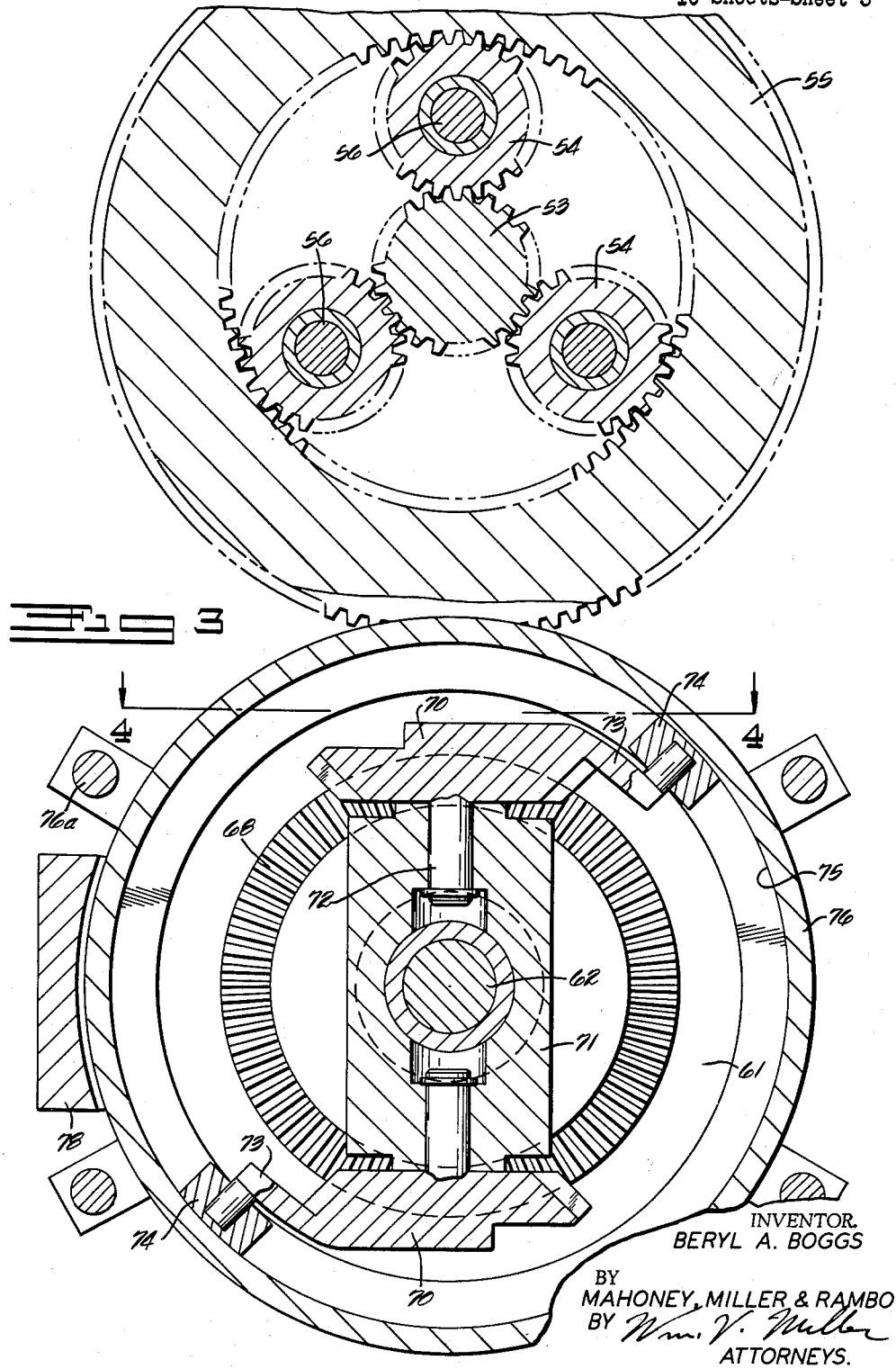
FIGURE 3 is an enlarged transverse sectional view take along line 3—3 of FIGURE 1 at the output side of the transmission.

Between the differential gears 60 and 61 are one or more differential gear pinions 70 which is of the bevel type and is in engagement with the opposed bevel gear portions 66 and 68, respectively, of the gears 60 and 61. In the example shown, a pair of these pinions 70 are illustrated but this number may be varied to provide any suitable number of angularly spaced pinions. Each of these pinions is mounted for rocking or oscillating movement about its own axis as well as for revolving or bodily traveling movement around the axis of the shaft 62 with which the gears 60 and 61 are concentric. As shown in FIGURES 1, 3 and 9, the pinions 70 are mounted at diametrically opposed points on a carrier block 71 which, in turn, is rotatably mounted on the shaft 62. Each pinion 70 is carried by a pin or shaft 72 which extends inwardly into radial bores formed in the block 71. Thus, the pinions can oscillate around their own axes and will revolve about the axis of the shaft 62 with the block 71, the block being free to rotate relative to the differential gears 60 and 61 between which it is disposed. The pinions 70 are shown with teeth extending completely therearound but since only part of these teeth are actually used, they may only have sections of teeth properly located.

Figure 4:
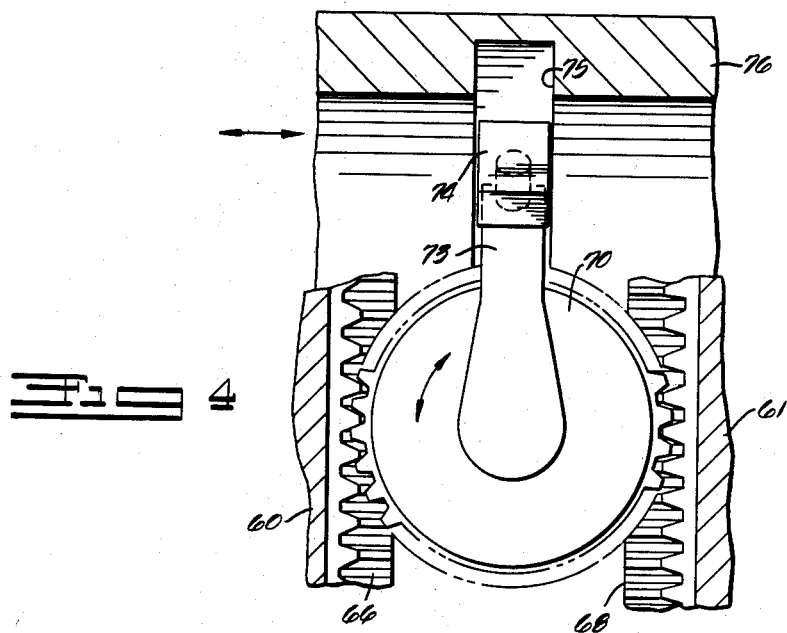
FIGURE 4 is a sectional view taken along line 4—4 of FIGURE 3 showing details of the oscillatable pinion which affects the differential gears to vary the output speed of the transmission.

For oscillating each pinion 70, each pinion is provided with a rocker arm 73 as shown best in FIGURES 3, 4 and 9. The arm 73 is fixed to the pinion or is an integral part thereof. It is curved or bent circumferential relative to the axis of the shaft 62 and is provided with a pivotally mounted guide shoe 74 at its outer end. Thus, the shoe 74 is spaced angularly relative to the axis of the shaft 62 away from the pinion 70. The shoes 74 are disposed on and are guided by a continuous groove 75 which is formed in the inner surface of a slide member in the form of a ring or cylinder 76 which surrounds the gear 60 and is axially movable relative thereto and to the shaft 62. This cylinder 76 is open at its inner end and is provided with slots in its circumferential wall to provide clearances for the various members such as brackets 37 and 63. The cylinder 76 will be supported concentric with the shaft 62 by means of suitable guides attached to the frame 38 which will permit axial reciprocable movement concentric with the shaft 62, but prevent rotation thereof. Various types of such guides may be provided but I have illustrated as one example, guide and supporting rods 76a (FIGURES 3 and 7) which may be supported longitudinally on the main housing and will extend slidably through lugs projecting radially outwardly from the member 76. For reciprocating the cylinder 76 axially, suitable control linkage is connected to its outer end wall by the pivot pin 77.

Axial movement of the cylinder 76 will rock the pinions 70 about their axes through the medium of the rocker arms 73 which are thereby moved laterally provided one or both of the gears 60 and 61 are free to rotate. This will aid in providing speed variation in the output shaft 50 as will be described later in detail.

Figure 5:
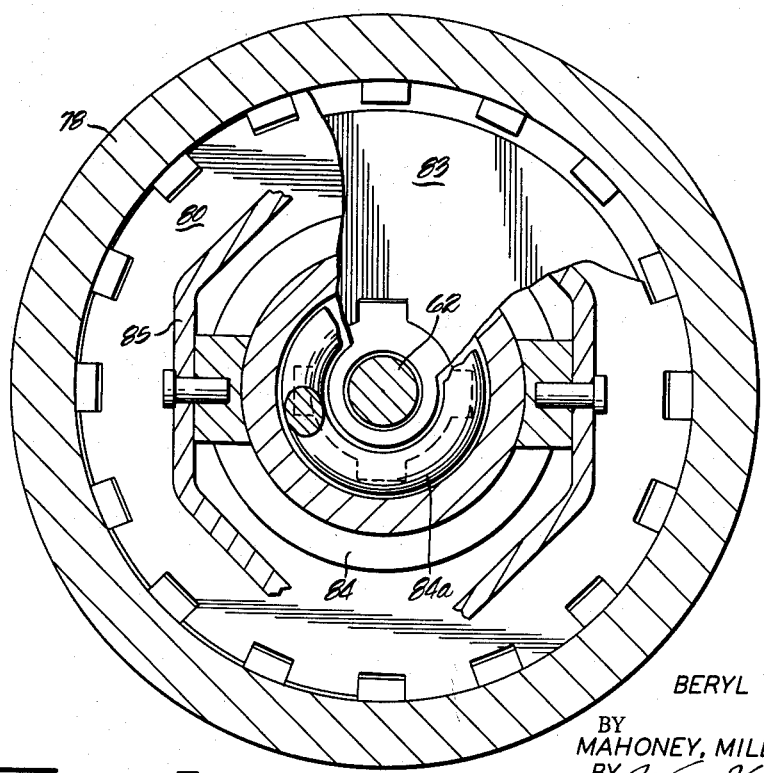
FIGURE 5 is an enlarged transverse vertical sectional view taken along line 5—5 of FIGURE 1 and showing details of one of the brakes of the control mechanism of the transmission.

A brake unit is provided for independently controlling rotation of the differential gears 60 and 61 about the axis of the shaft 62. The brake mechanism of this unit is enclosed within a drum-like housing 78 as shown in FIGURE 1. This housing has a hub 79 on its outer end which is rotatably mounted in the main housing wall 32 and which rotatably receives the outer end of the shaft 62. The opposite end of the drum 78 is rotatably supported in the support bracket 63. The inner end of the drum 78 is provided with a central opening for rotatably receiving a hub extension 82 of the differential gear 61 on which it is mounted in a roller bearing 82a. Any suitable brake mechanism may be provided for selectively controlling the gears 60 and 61, but the mechanism is shown as comprising brake discs 80 and 81 for controlling the respective gears 60 and 61. Each disc has an inner liner 83 carried thereby and is provided with the usual notched peripheral edge for engagement with corresponding lugs on the drum 78 as indicated in FIGURE 5. The disc 80 is disengaged by a collar 84 and a cooperating yoke and lever 85. The disc 81 is disengaged by a similar arrangement including a pivoted lever 86. A compression spring 84a between the opposed collars normally keeps both brake discs engaged. The levers 85 and 86 are pivoted to the drum 78 by the respective pivots 87 and 88 which are so arranged that movement to the right of the lower end of either of the levers will release the brake disc which that lever controls. To exert a releasing push on the lower end of each lever, the control push-rods 89 and 90 are provided and these rods are controlled by the respective cams 91 and 92. If desired, these rods may be provided with means (not shown) for adjusting their lengths. These cams are axially spaced on a cam-shaft 93 which is rotatably supported from the main housing by the supporting brackets 94 and 95 and is disposed at a right angle to the input shaft 35. The cam shaft 93 is driven from the shaft 35 by a bevel pinion 96 keyed to the shaft 35 and a bevel pinion 97 keyed to the shaft 93.

The cams 91 and 92 may be of the outline shown in FIGURE 8 where the cam 92 is shown associated with the rod 90, in engagement with a cam follower 98 on the end thereof.

The brake-actuating rods 89 and 90 are moved alternately to disengage the respective brake discs 80 and 81. They are also moved in timed relationship to the reciprocation of the cylinder 76 axially of the shaft 62. As previously indicated, the cylinder 76 is reciprocated by linkage connected thereto at the pivot pin 77. This linkage is actuated by cam means and the linkage is variable to vary the extent of reciprocation of the member 76. This linkage and associated cam means is illustrated best in FIGURES 1 and 7.

Thus, the pivot pin 77 (FIGURE 7) pivotally connects to the member 76 a bell-crank lever 100 which swings about an adjustable fulcrum axis provided by trunnions 101. These trunnions 101 are carried by a slide member 103 adjustable along a slide portion 104 on the lever 100 and which can be fixed along the guide by rotating the speed selector shaft 107 shown in FIGURE 1. The trunnions 101 are engaged by a yoke on the outer end of a rocker arm support 106 which is keyed at its inner end on the speed selector rock shaft 107 which is parallel to the shaft 93. The shaft 107 is rotatably carried by suitable supports 108 and 109 which are carried by the main housing. Adjustment of the axis of the trunnions 101 toward or from the axis of the pivot 77 by rotating the shaft 107 will vary the fulcrum point of the lever 100 and, therefore, vary the extent of reciprocation of the member 76. Suitable means (not shown) may be provided for rotating the shaft 107 and holding it in any selected position to which it is rotated. The rotating means may be power operated or manually operated.

The lever 100 is swung about the fulcrum axis provided by trunnions 101 by means of a cam unit 112 which is carried by and keyed to the cam shaft 93. This cam unit is of a design to prevent backlash and is shown as consisting of two cams 113 and 114 which are engaged respectively by the followers 115 and 116 which are carried on opposite sides of a yoke portion 117 on the lever 100. This type of cam is known as a positive return cam and the two followers produce constraint over the entire cycle, the outward and return motions produced by the cam unit being the same. Thus, the cam unit 112 and associated linkage serves to positively receive the member 76 alternately in opposite axial directions.

Cam and linkage means is also provided for oscillating the brake drum or housing 78 about the axis of the shaft 62 in timed relationship to the reciprocation of the cylinder 76. This means includes a cam 120 which is keyed to the cam shaft 93 as shown in FIGURES 1 and 6. This cam 120 engages a roller or follower 121 on the bell-crank lever 100a which is somewhat similar to the lever 100. This lever is similarly mounted but an anchored tension spring 122 is connected to its lower end and tends to keep the follower 121 in engagement with the cam 120. However, in operation the reaction forces from the planetary gear trains act in the same direction as the spring tension to keep the follower against the cam. This lever 100a like the lever 100 is provided with an adjustable fulcrum axis 101a.

The lever 100a is supported by a link 110a and is pivoted at 77a to the end of a link 125 which has its other end pivoted at 126 to a bell-crank lever 127. This lever 127 is fulcrumed at 128 to a fixed support 129 attached to the main housing. The opposite end of the lever 127 extends in an axial direction over the member 78 and is pivoted to a link 130. The link 130 extends tangentially to the member 78 and is pivoted thereto at 131. Thus, it will be apparent that rotation of the cam 120 will rock or oscillate the member 78 about the axis of the shaft 62 and the extent of this oscillation can be varied by adjustment of the fulcrum axis 101a.

The operation of this transmission will best be understood by reference to FIGURES 1, 9, 10, 11, and 12. Assuming the input shaft 35 is driven continuously, the cam shaft 93 will also be driven continuously and the main actuating cam unit 112 as well as the compensating cam 120 and the brake cams 91 and 92 will rotate therewith. As previously indicated, the drive is transmitted through the two epicyclic gear trains, one acting to increase speed and the other acting to reduce speed. One member of each train is permitted to alternately rotate at a controlled speed while absorbing the reaction force of the other two members. In FIGURE 9, the input shaft 35 is rotated clockwise and drives the sun gear 40 fixed thereon and the sun gear drives the planetary gears 41 about their axes which, in turn, tends to rotate the ring gear 46 counterclockwise. However, assuming that gears 46 and 55 are stationary, the sun gear 40 rotates the gears 41 about their axes, and causes them to travel around the interior of the gear 46 thereby rotating the carrier 42 clockwise. Rotation of the carrier 42 causes the planetary gears 54 to revolve within the gear 55 and to be driven about their axes, thereby driving the central gear 53 and the output shaft 50 in a clockwise direction the same as the input shaft 35. Thus, with both the gears 46 and 55 stationary, the output shaft 50 is driven at the same speed and in the same direction as the input shaft 35. This condition only occurs when the fulcrum point 101 of the linkage actuated by the main actuating cam 112 is adjusted so as not to produce axial movement of the member 76 and, consequently, so as not to produce oscillation of the differential pinions 70 and, consequently, rotation of the gears 60 and 61 about the axis of the shaft 62. At this time, the fulcrum 101a of the linkage actuated by the compensating cam 120 would also be in position to render that linkage ineffective. The cams 112 and 120 would, therefore, produce no action but the brake cams 91 and 92 would alternately engage and disengage the brakes 80 and 81.

If the fulcrums 101 and 101a are now positioned to swing the levers 100 and 100a through the control of the respective cams 112 and 120, the speed of rotation of the output shaft 50 will be reduced relative to that of the input shaft 35 but the direction of rotation will be the same. The amount of variation will be determined by the settings of the fulcrum points 101 and 101a which will determine the extent of axial reciprocation of the cylinder 76 and the extent of oscillation of the drum 78 about its axis.

Reciprocation of the member 76 alternately or successively permits rotation of these gears 60 and 61 about the axis of the shaft 62. Assuming the member 76 is moved to the right of FIGURES 1 and 9, the pinions 70 will be rotated clockwise about their axes through short arcs at a uniform velocity. The brake cams 91 and 92 are so set relative to the actuating cam 112 that at this time the brake 80 will be engaged while the brake 81 will be released. Therefore, the gear 60 will be permitted to rotate counterclockwise for the interval while the pinions 70 are being rotated clockwise. This actuation is by the reaction forces of the input epicyclic gear train acting through the gear 46 and controlled by the cam 112. Rotation of the pinions 70 about their axes causes them to roll on the gear portion 63 of the locker gear 61 and to thereby travel or walk around such gear in a counterclockwise direction causing the block 71 to revolve about the axis of the shaft 62, the guide shoes 74 traveling in the guide groove 75 of the member 76. This permits the reaction force to rotate the gear 60 counterclockwise about the axis of the shaft 62. Conversely, when the member 76 is moved to the left, the pinions 70 are rotated counterclockwise. The brake 81 will be engaged while the brake 80 is released. Therefore, the gear 61 will be permitted to rotate counterclockwise for the interval when the pinions 70 are rotated counterclockwise. The reaction forces of the output epicyclic gear at this time acting through the gear 55 will permit rotation of the gear 61 counterclockwise, while the pinions 70 are rotating counterclockwise and traveling counterclockwise around the gear portion 66 of the locker gear 60.

The speed of rotation of the output shaft 50 depends upon the speed of rotation of the gears 60 and 61. The speed of these gears is determined by the position of the fulcrum 101. The main actuating cam 112 and the brake cams 91 and 92 are set on the cam shaft 93 relatively so as to permit release of one brake only at any one time and movement of the arms 73 to be in the direction to move the free gear 60 or 61. Normally, the reaction force from the epicyclic gear trains will actuate the gears 60 and 61 and the main actuating cam 112 only controls the rate of rotation of the gears due to that reaction force. The setting of the variable fulcrum 101 provides a constant relationship between the rotation of the input shaft 35 and the reciprocation of the cylinder 76 and the consequent rocking of the arms 73. The same amount of time is required for a complete stroke of the member 76 regardless of the position of the fulcrum 101.

The output speed can be varied, as indicated above, by changing the position of the fulcrum 101. The velocity of the output shaft, however, will fluctuate if no means is provided to offset it, since the velocity of the output shaft increases above the normal velocity twice during each revolution. This fluctuation is caused by the transient occurring at the end of each stroke of the linkage actuated by the cam 112. To overcome this fluctuation, a third motion is provided for smoothing the output speed and to allow more time for static engagement and release of the brakes 80 and 81. Thus, the brake housing 78 and its enclosures including the shaft 62 along with the differential unit including the gears 60 and 61 is rotated about the axis of the shaft a slight amount while the rocker arms 73 are at the end of each stroke. Thus rotation is by means of the compensating cam 120 and the associated linkage which is connected to the drum 78 at the pivot point 131 as previously indicated. This movement of the lever 100a by the cam 120 is returned or recovered during movement of the rocker arms 73. The lever 100a provides a useful function in one direction only while the lever 100 serves a purpose in its movement in both directions, hence the differences in the cams. The fulcrum 101a may also be adjusted to determine the movement of the associated lever 100a which will be related to the movement of the lever 100. When the output speed is to be the same as the input speed, the fulcrum points 101 and 101a are both adjusted to prevent movement of both levers 100 and 100a and thereby prevent reciprocation of the cylinder 76 and oscillation of the drum 78 along with the brakes 80 and 81 and differential gears 60 and 61, by the compensating cam, about the axis of the shaft 62. The term "transient" refers to the dead time at the end of each stroke between the finish of a stroke in one direction and the beginning of a stroke in the other direction.

Figure 11:
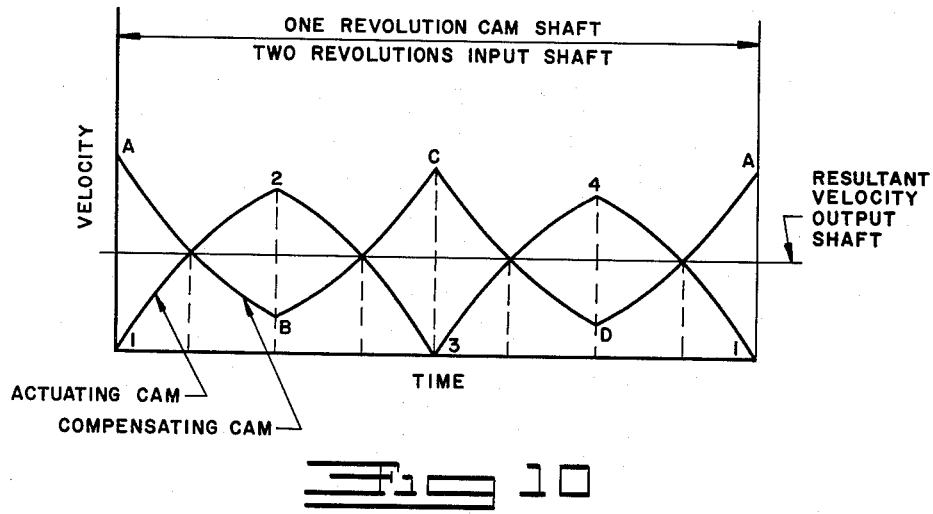
FIGURE 11 is a diagram of the main actuating cam.
Figure 12:
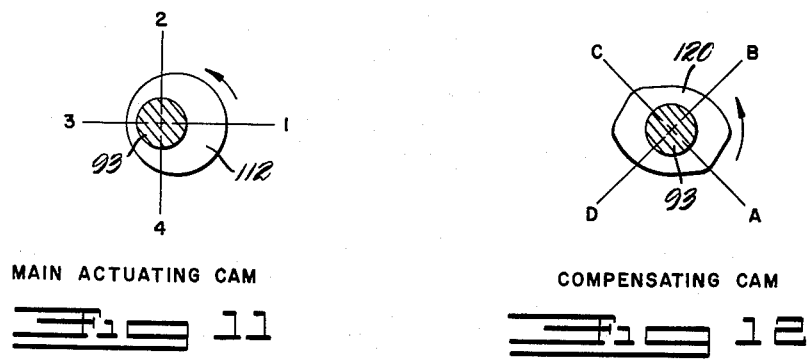
FIGURE 12 is a diagram of the compensating cam.

A comparison of the diagrams of the cams 112 and 120 of FIGURES 11 and 12, respectively, with the time-velocity diagram of FIGURE 10 will incidate the relationship of the action of these cams.

In FIGURE 13, there is shown a different compensating cam and linkage arrangement for oscillation of the drum housing 78b about its axis. A spring 125 disposed tangentially of the housing tends to keep the follower 121b against the cam 120b permitting the housing to rotate in the direction of the spring force. Linkage 125b is provided and this linkage is actuated by the cam 120b. Cam 120b must absorb the reaction forces of both planetary gear trains. This force is transmitted through the cam shaft bearings to the frame of the transmission. A different arrangement of the adjustable slide member 103b is provided, it being adjustable along a slide 100b. The fulcrum is at the point 101b but adjustment of the slide 103b will vary the extent of the stroke of the linkage 125b. This adjustment may be made by means of the rock shaft 107b and the connecting linkage 106b.

In FIGURE 14, a different arrangement of main actuating cam is shown. In this instance, the cam is in the form of an eccentric 112c, which is disposed within a ring on a connecting rod 117c. This rod is pivoted to a lever 100c which carries a slide on which the slide member 103c is mounted for adjustment. A connecting slide member 77c is provided between the slide 100c and the cylinder 76c, the connecting slide being slidable radially in a guide provided on the end wall of the cylinder. The fulcrum is at the point 101c and it will be apparent that varying the position of the slide member 77c along the slide carried by the cylinder 76c will vary the extent of movement of the cylinder. This adjustment is made by shaft 107c and connecting linkage 106c.

Various types of connecting linkages actuated by various types of cam may be provided. Also, as previously indicated, various types of brakes may be employed. Furthermore, any member of the planetary gear train can be used for the driving and driven member or for the reaction member.

As indicated above, one member of each epicyclic train is permitted to rotate at a controlled speed while absorbing the reaction force of the other members. In ordinary speed reducing or increasing planetary gear trains, this reaction member is keyed or otherwise secured to the frame. In my transmission, the reaction is transferred to the frame through the differential gears 60 and 61, the pinions 73, the reciprocable member 76, the linkage and cam shaft 93 and finally to the frame. In the form of the invention described, the ring gears 46 and 55 transfer this reaction. However, other arrangements for transferring the reaction may be provided.

Figure 16:
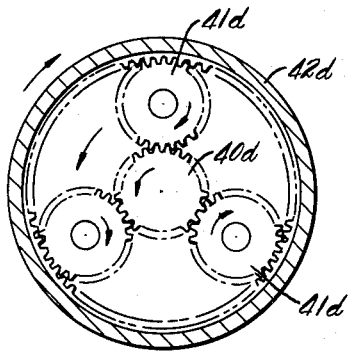
FIGURE 16 is a transverse sectional view taken along line 10—10 of FIGURE 13.
Figure 15:
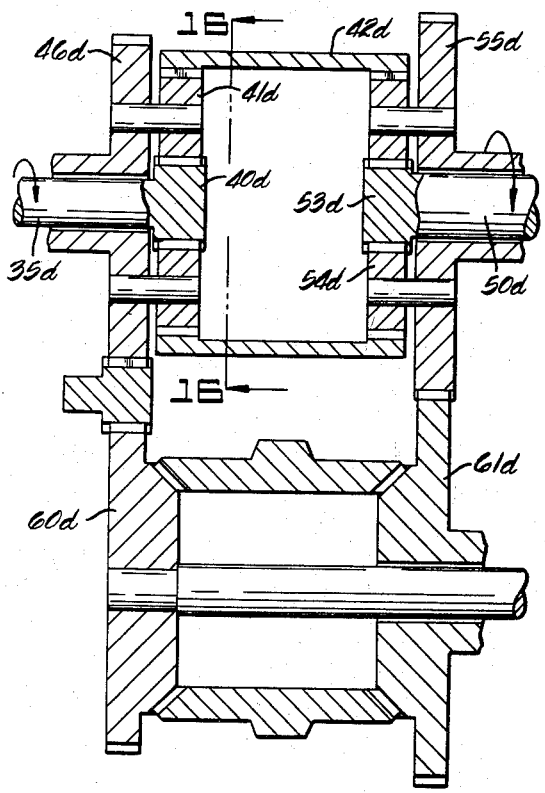
FIGURE 15 is an enlarged axial fragmentary sectional view showing a different epicyclic gear train arrangement along with a different arrangement for connecting the differential speed changing gears to the epicyclic gear trains.

Thus, in FIGURES 15 and 16, I show a different arrangement in which the planetary gear support 46d is the reaction member. This member supports the planetary gears 41d which mesh with a ring gear within the cage 42d and these gears are disposed around the central gears 40d carried by the input shaft 35d. The cage 42d also encloses and meshes with the output planetary gears 54d which surround and mesh with a central gear 53d carried by the output shaft 50d. The gears 46d and 55d engage the differential gears 60d and 61d of the differential unit which will be exactly the same as described above.

Figure 17:
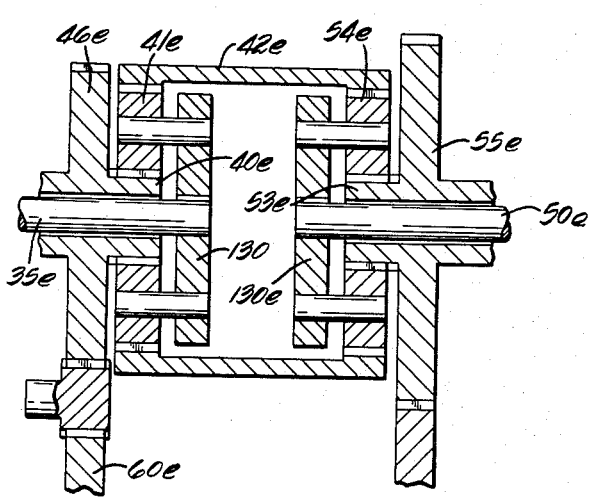
FIGURE 17 is an axial sectional view showing still another arrangement of epicyclic gearing.

In the example shown in FIGURE 17, a sun gear reaction member train is employed. The input shaft 35e passes through the sun gear portion 40e which is part of the gear 46e that transfers the reaction to the differential gear 60e. A support 130 within the double ring gear 42e and keyed on the input shaft 35e carries the pinions 41e so that they are around and mesh with the sun gear portion 40e and which also mesh with the teeth of the associated ring gear teeth on the interior of the member 42e as in the structure shown in FIGURE 15. The gearing at the output side for driving the shaft 50e is the same. With the reactive sun or central gears 40e and 53e stationary, the rotation applied to the input shaft 35e rotates the support 130, and through the planetary gears 41e drives the ring gear member 42e. This rotates the planetary gears 54e to rotate the support 130e and drive the output shaft 50e. If the gears 46e and 55e are allowed to rotate at a controlled rate by the differential gearing unit, then the speed of the output shaft is affected proportionately.

In principle, it will make no difference which member of the epicyclic train is used as the reaction member.

The transmission described is designed as a speed reducer. To have it function as a speed increaser it is merely necessary to reverse the rotation of the cam shaft. Reversing the direction of the cam shaft does not change the timing relationship between the main actuating cam, the compensating cam and the brake cams. Therefore, the actuating force is against the direction of reaction force and will increase the output speed above the input speed. The action of the compensating cam has also been reversed and is increasing the output speed while the main actuating linkage is reversing strokes. If the transmission is to be used as an increaser only, then it may be designed exactly as shown and previously described, except that the cam shaft drive bevel gear 96 on the input shaft (FIGURE 1) must be reversed and located on the opposite side (not shown) of the cam shaft bevel gear 97. This will cause the cam-shaft to rotate in the opposite direction and all cam actuating forces will be acting against the reaction forces of the planetary gear trains. Another method of changing the transmission to an increaser is to reverse the position of the main actuating cam and install a reversed profile compensating cam (not shown) and by driving the cam shaft in the same direction as for a reducer. The brake cams would remain in the same position relative to the timing as for a reducer.

As indicated in FIGURE 18, however, the transmission can be provided with control means for selectively causing it to function as a reducer or an increaser. With this arrangement, the entire transmission is the same as before as indicated schematically in this figure. The cam-shaft 107g is driven by a pinion 97g as before. However, this pinion 97g can be selectively driven in either direction. For this purpose, a pair of bevel pinions 96g are splined on the input shaft 35g at diametrically opposed points relative to the pinion 97g. One of these pinions 96g is engaged with the pinion 97g when the other is out of engagement. The pinions 96g may be shifted by yoke levers 131 actuated by a single control rod 132. Obviously, engagement of either of the pinions 96g with the pinion 97g will occur when the input shaft 35g is stationary. Thus, the cam shaft 107g may be rotated in either direction selected to convert the transmission from a reducer to an increaser or vice versa.

If it is desirable to change from an increaser to a reducer, or vice versa, while the input shaft is rotating, the pinions 96g may be loose on the shaft and engaged with the gear 97g at all times. Then it will be necessary to have a friction type clutch (not shown) associated with each pinion for alternately connecting the pinions to the shaft 35g. The cam-shaft in this example and in the previous example may be driven by the input shaft in any desired speed ratio.

When operated as a variable speed reducer, the reaction forces of the planetary trains acting upon the cams tend to contribute to the direction of rotation of the cam-shaft. When operating as an increaser, these forces oppose the cam-shaft rotation.

Old methods of providing variable speed rotation from constant speed drive include direct current electric motors, hydraulic motors, variable pitch pulleys, and friction drives. None of these provide positive drive relationship, and most do not provide a broad range of speeds. All are expensive and generally inefficient.

As far as I am aware, there has never been a variable speed transmission with the advantages of the novel invention described herein. This design has unlimited capacity and can be used on all prime movers including electric motors and combustion engines. It can be used for instrument drives or for power transmission drives. The basic unit will not wear out because all parts are replaceable. Usual maintainance is bearing replacement. Within design capacity, it is a positive drive transmission. An additional speed reducer or increaser can be installed either before or after the transmission (not shown) to further increase the speed range. For example, with a driver speed of 3600 r.p.m. acting through a 2 to 1 increaser, output speed from the transmission can be adjustable from 7200 r.p.m. forward to minus or reverse 1000 r.p.m.

My transmission has no provision for overrunning. Upon deceleration the load cannot cause the output shaft to rotate faster than the speed setting. Excessive overrunning forces would be absorbed in the brake mechanism and no damage would result. Where a coasting or overrunning feature is desired, a separate clutch (not shown) should be provided at the output. An important feature is that the brakes do not perform any actual braking of speed and are always engaged and released in static relationship with their respective members. Another feature is that all parts can be balanced to reduce vibration to a minimum.

Where smooth rotational power is not a requirement, or where an overrunning clutch is used, the adjustment of the stroke on the third, or transient compensating cam, can be eliminated. This cam would then provide a constant stroke length to the mechanism which would require compensation by the main adjustable speed actuating strokes. All cams are shaped to provide uniform velocity to final desired movements. Also, in some applications, it might be desirable to drive the speed controlling cams and mechanism with a separate motor (not shown). It might be further desired in some cases to drive all actuating members at reduced speed and this can be provided by connecting all cams to the input drive through a geared reducer (not shown). This allows less frequent strokes of actuating members, but does not impair the output speed quality. There may also be applications where the compensating cam and its associated mechanisms can be omitted completely.

It will be understood that the drawings do not necessarily show the transmission and its parts in their exact shape, size or proportion, and the arrangement is selected to best illustrate the principles and motions involved. The size and type of gearing is representative only and any suitable gearing may be used. Also, the cams may be of any suitable type with suitable connecting means. Furthermore, the brakes may be of any suitable type and be actuated by any suitable means.

Having thus described my invention, what I claim is:

1. A transmission comprising an input member and an output member, a planetary gear train driven by the input member and a planetary gear train driving the output member, means for operatively connecting said gear trains together, each of said gear trains comprising a plurality of gears, means for controlling the speed of the output member, said means comprising a differential gear unit comprising a pair of coaxial rotatably mounted differential gears, each of which engages with one of the gears of the respective planetary gear trains and both of which rotate in the same direction, at least one differential pinion between the differential gears and meshing therewith, means for mounting said pinion for revolving movement about the axis of said differential gears and for oscillating movement about an axis extending radially of said gears, means for oscillating said pinion about its axis, and means for alternately locking one of said differential gears to prevent rotation about its axis and releasing the other of said differential gears for rotation about its axis in timed relationship to oscillation of said pinion.

2. A transmission according to claim 1 in which said means for oscillating said pinion includes means adjustable to determine the extent of oscillation of said pinion.

3. A transmission according to claim 2 in which said oscillating means is cam-actuated.

4. A transmission according to claim 1 in which said gears engaged by the respective differential gears are spaced relatively in the direction of their axes, said gears of said differential unit being correspondingly axially spaced to engage said gears, said oscillatable pinion being disposed between said axially spaced differential gears which are coaxial and meshing with teeth on the adjacent faces thereof, said means for mounting said pinion comprising a support member disposed between said coaxial differential gears and mounted for rotation about the common axis thereof, said pinion being mounted for oscillation on said support member about an axis extending radially thereof.

5. A transmission according to claim 4 in which said differential gears are mounted in surrounding relationship to a common shaft, one of said gears being keyed to said shaft and the other being rotatable relative to said shaft, said support member being mounted on said shaft between said gears for rotation relative to said shaft, said means for releasing and locking the gears comprising a pair of brakes mounted in surrounding relationship to said shaft, one of said brakes controlling rotation of said shaft and the gear keyed thereto and the other of said brakes controlling said gear which is rotatable relative to said shaft.

6. A transmission according to claim 5 in which a plurality of said pinions are provided in engagement with said differential gears at positions spaced angularly around said gears and said shaft, said oscillating means oscillating all of said pinions simultaneously about their axes, said oscillating means comprising rock arms extending radially from said pinions and a slide movable longitudinally of said shaft and operatively connected to said rock arms.

7. A transmission according to claim 6 in which each of said rock arms extends radially from its respective pinion and has a guide portion on its outer end, said slide being in the form of a sleeve concentric with said shaft mounted for reciprocation but prevented from rotation relative to said shaft, said oscillating means also including cam means for reciprocating said sleeve axially of said shaft, said sleeve having a guide channel extending circumferentially thereof for receiving said guide portions on said rocker arm.

8. A transmission according to claim 7 in which said cam means includes a cam shaft carrying a cam, said shaft being driven by said input member, and actuating linkage between said cam and said sleeve slide.

9. A transmission according to claim 8 in which said cam shaft also carries a pair of brake-actuating cams, and linkage operatively connecting said cams to said brakes.

10. A transmission according to claim 9 in which said brakes and the differential gears which they control comprise an assembly rotatable about the axis of said shaft, and means for oscillating said assembly about the axis of said shaft in timed relationship to the reciprocation of said sleeve.

11. A transmission according to claim 10 in which said last-named oscillating means comprises a cam carried on said cam shaft, and actuating linkage between said cam and said assembly.

12. A transmission according to claim 11 including selective means for changing the direction of rotation of the cam shaft.

13. A transmission according to claim 12 in which said linkage is adjustable to vary the degree of oscillation.

14. A transmission according to claim 1 in which said differential gears and said means for locking and unlocking the gears comprise an assembly rotatable about the axis of said gears, and means for oscillating said assembly about said axis in timed relationship to oscillation of said pinion.

15. A transmission comprising an epicyclic gear train driving an output member, means, for controlling the speed of said output member, said means comprising a differential gear unit comprising a pair of coaxial rotatably mounted differential gears, each of which engages with a gear of the epicyclic gear train, at least one gear member between the differential gears and meshing with teeth on the adjacent faces thereof, means for mounting said gear member for rocking movement about an axis radial of the differential gears and for revolving movement about the axes of such gears, means for rocking said gear member, and means for alternately locking one of said differential gears to prevent rotation about its axis and releasing the other of said differential gears for rotation about its axis in timed relationship to rocking of said gear member.

16. A transmission according to claim 15 in which said differential gears and said means for locking and unlocking the gears comprise an assembly rotatable about the axis of said gears, and means for oscillating said assembly in timed relationship to the rocking of said gear member.

17. A transmission comprising an input member and an output member, means for connecting said members together for rotation at relatively different speeds, said means including two reaction members rotatable in the same direction, means for controlling rotation of said reaction members, said means comprising two coaxially disposed and axially spaced differential members engaging said reaction members, a speed-control member positioned between said differential members and engaging with the adjacent faces thereof, means for mounting said member for rocking movement about an axis radial of the differential members and for revolving movement about such members, and means for alternately locking one of said differential members to prevent rotation about its axis and releasing the other of said differential members for rotation about its axis in timed relationship to rocking of said member.

References Cited in the file of this patent

"Product Designs—Cams Curves in Welding," Product Engineering, July 10, 1961, pp. 66, 67.